July 13, 1965  L. W. TOELKE  3,194,437
DISPENSING APPARATUS
Filed Sept. 3, 1963  2 Sheets-Sheet 1
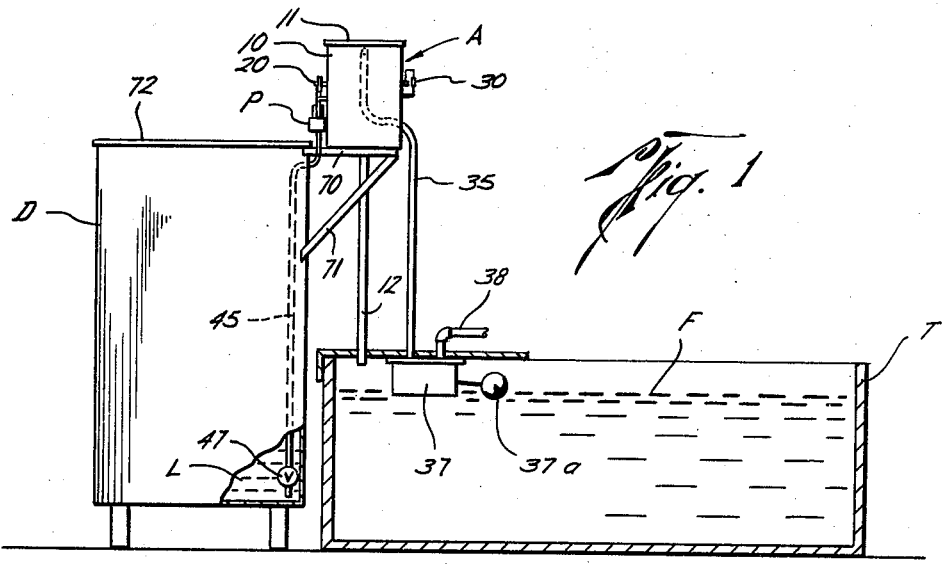
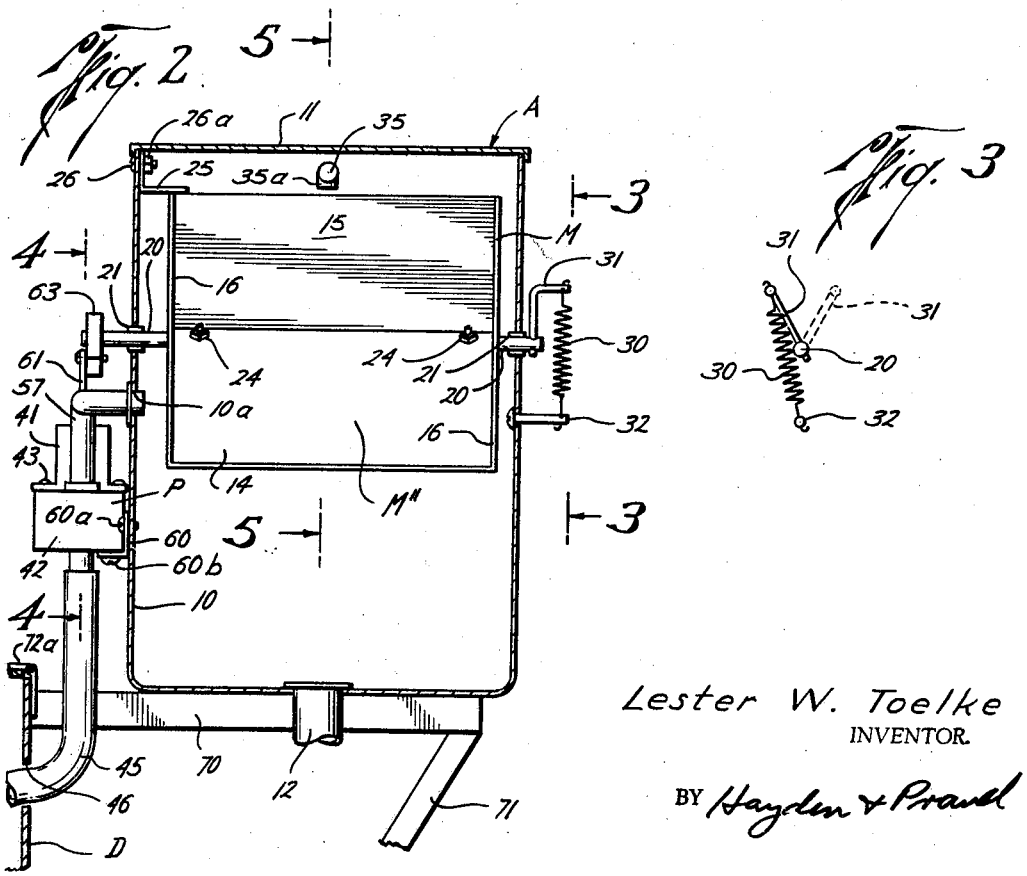
Lester W. Toelke
INVENTOR.
BY Hayden & Prawl
ATTORNEYS

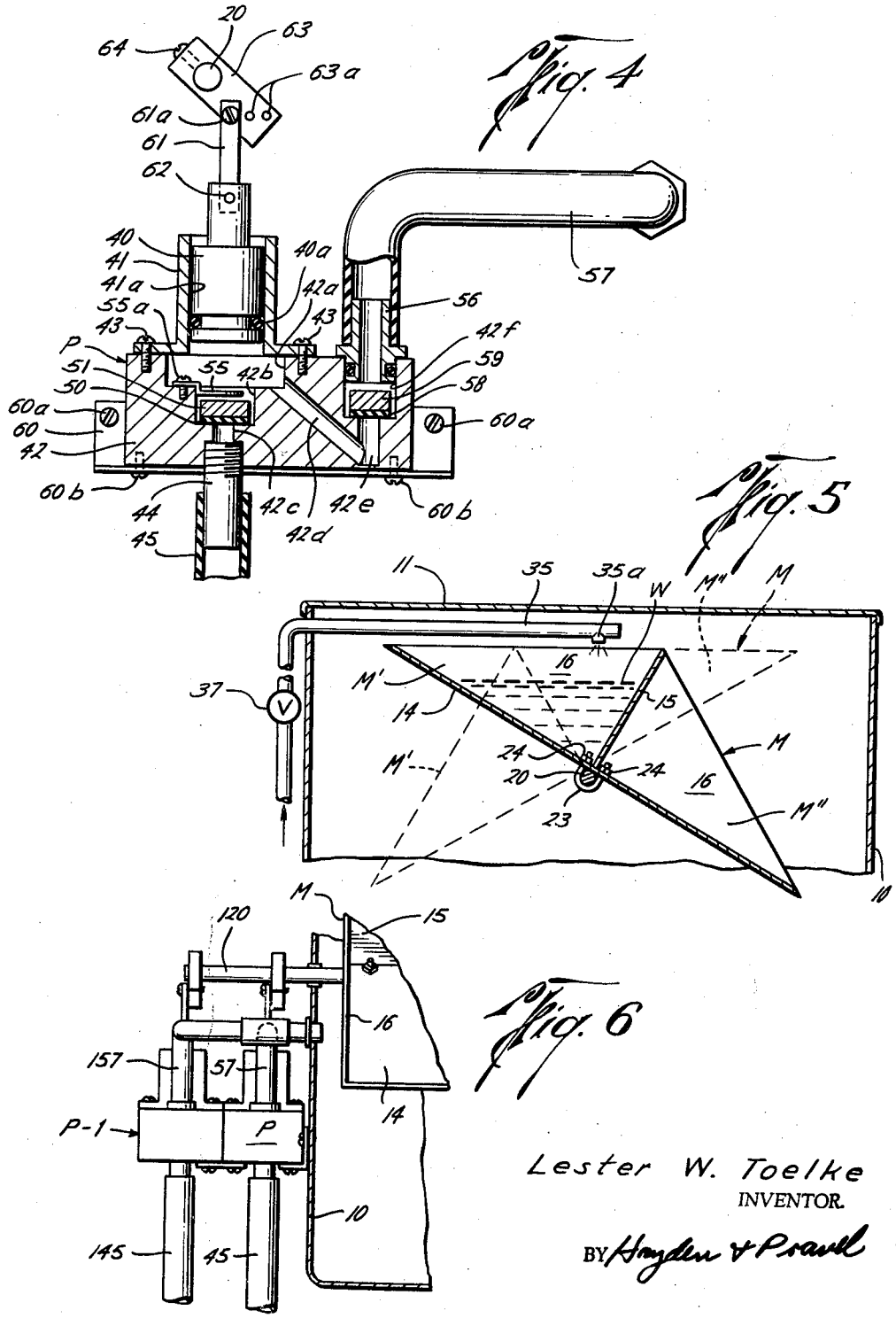

United States Patent Office 3,194,437
Patented July 13, 1965

3,194,437
DISPENSING APPARATUS
Lester W. Toelke, 2308½ Bingle Road, Bldg. B,
Houston, Tex.
Filed Sept. 3, 1963, Ser. No. 305,959
2 Claims. (Cl. 222—57)

This invention relates to new and useful improvements in dispensing apparatus, and particularly apparatus for proportionately dispensing liquids or flowable materials.

It has been known for a number of years that cattle and other livestock benefit materially when various mineral supplements such as calcium and phosphorous are supplied to the livestock in their drinking water. For many years such supplements were fed "free choice" from boxes. Efforts have also been made to provide automatic dispensing equipment for dispensing supplements to livestock in their drinking water; however, the automatic dispensing apparatus heretofore known has been excessively expensive, has had a relatively large number of working parts, and has been generally unsatisfactory, primarily because it has not been sufficiently rugged in constuction so as to be dependable over prolonged periods of time.

An object of the present invention is to provide a new and improved dispensing apparatus for dispensing livestock supplements and other materials which is inexpensive, has relatively few working parts, and is rugged and dependable in operation over prolonged periods of time even when unattended.

Another object of this invention is to provide a new and improved dispensing apparatus for automatically dispensing proportioned quantities of a material.

A further object of this invention is to provide a new and improved apparatus for dispensing a first component, usually liquid, using measured quantities of a second component for effecting the dispensing of the first component, whereby the dispensing of the first component is proportional to the measured amounts of the second component.

A particular object of this invention is to provide a new and improved dispensing apparatus having a measuring pan with at least two sections each of which is adapted to alternately receive a predetermined quantity of water or other material for causing an alternating movement of such pan which serves to provide the power for dispensing a predetermined quantity of another liquid or other material.

A specific object of this invention is to provide a new and improved dispensing apparatus having a pump to dispense a first flowable material from a supply into a mixing chamber, wherein the pump is actuated by the pivoting of a measuring pan back and forth, and wherein such pan is caused to pivot back and forth by alternately receiving a second flowable material in one section thereof and discharging the second flowable material from another sectioin thereof, such second flowable material preferably being mixed with the first flowable material in the mixing chamber so as to obtain a desired concentration of the admixed materials.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in elevation and partly in section, illustrating one manner in which the apparatus of this invention may be used;

FIG. 2 is a vertical sectional view, partly in elevation, illustrating the dispensing apparatus of this invention in its preferred form, and enlarged as compared to the illustration of such apparatus in FIG. 1;

FIG. 3 is a view taken along line 3—3 of FIG. 2, and illustrating in particular the means for controlling the position of the measuring pan or actuating means of the dispenser apparatus of this invention;

FIG. 4 is a view taken along the line 4—4 of FIG. 2 and illustrates in particular details of one form of positive displacement pump which is adapted to be used for metering predetermined quantities of a livestock supplement or other material;

FIG. 5 is a view taken along line 5—5 of FIG. 2 which illustrates the measuring pan or actuating means of this invention in the two alternate positions, one in solid lines and one in dotted lines; and FIG. 6 is a fragmentary elevation, partly in section, illustrating an alternative embodiment of this invention wherein two metering pumps are connected to a single measuring pan for proportionately pumping two different materials in response to the alternate movements of the actuating means of the dispensing apparatus of this invention.

In the drawings, the letter A designates generally the apparatus of this invention which, as will be explained more in detail hereinafter, is adapted to be used for dispensing a liquid or other flowable material L from a container or drum D. Such flowable material L is dispensed in proportion to the amount of water or other flowable material W which is introduced into the apparatus A. The two materials W and L are preferably mixed together and introduced into a tank T or other point of use. By reason of the construction of the apparatus A of this invention, as will be more evident hereinafter, the flowable material L is dispensed in proportion to the flowable material W economically, dependably, and automatically.

Considering the invention more in detail, the apparatus A includes a housing 10 which has a removable cover 11 at its upper end. The housing 10 and the cover 11 are preferably made of stainless steel, fiber glass, synthetic resin, plastic or other material which is resistant to various types of chemicals and corrosion, although the particular material selected may vary depending upon the conditions of use. The housing 10 actually serves as a mixing chamber in the preferred embodiment of this invention, as will be more evident hereinafter, and the mixed liquids are discharged from such housing or mixing tank 10 through a suitable outlet pipe or tube 12. When the apparatus A is used in conjunction with the tank T as shown in FIG. 1, the pipe or tube 12 extends to the tank T so that the liquid from the housing 10 is discharged into the tank T. The pipe or tube 12 may be formed of rubber, plastic, or any material which is capable of withstanding the chemical action of the liquids being discharged therethrough.

A measuring pan or actuating means M (FIGS. 2 and 5) is disposed in the upper portion of the housing or chamber 10. In the form of the invention illustrated in the drawings, the measuring pan M includes two sections M' and M'' which are formed by a bottom plate 14, a central divider 15, and triangular-shaped side members 16. The outer ends of each of the sections M' and M'' are open so that when the measuring pan M is inclined in the first position shown in solid lines in FIG. 5, the water or other flowable material in the section M'' is discharged therefrom. Likewise, when the measuring pan M is in the dotted line position shown in FIG. 5, the section M' is in a position to discharge the water or other flowable material therein. When the section M'' is in a position to discharge the water therefrom as shown by the solid lines in FIG. 5, the other section M' is in a position to receive and hold water W or other flowable material until a predetermined amount of such water W or other flowable material has been received, as will be more evident hereinafter.

Similarly, when the measuring device M is in the dotted line position of FIG. 5, the section M″ is in a position to receive the water W or other flowable material until a predetermined quantity has been received.

The measuring pan M is secured or attached to a rotatable shaft 20 which extends through suitable bearings 21 in the sides of the housing 10. Preferably the bottom plate 14 is connected to the rotatable shaft 20 with U-bolts 23, each of which has nuts 24 threaded thereon. By reason of such attachment of the measuring device M to the shaft 20, the pivoting movement of the measuring device M is transmitted to the shaft 20 for a purpose to be hereinafter described. The extent of the pivoting of the measuring pan M in either direction is controlled by pan stops 25, one of which is shown (FIG. 2). The pan stop 25 illustrated in FIG. 2 is adjustably secured to the housing 10 by a bolt 26 and a nut 26a or any other suitable attaching means. Normally, the position of the stop 25 is adjustable so as to control the degree of pivoting of the measuring device M. The stop 25 illustrated in FIG. 2 controls the pivotal movement of the measuring device M in a clockwise direction as viewed in FIG. 5, and a similar stop is provided (not shown) for limiting the pivotal movement of the measuring device M in a counterclockwise direction as viewed in FIG. 5.

It is desirable, although not necessary, to provide a means to maintain the measuring pan M in either the solid line position of FIG. 5 or the dotted line position of FIG. 5 until such time as a predetermined quantity of the water W or other flowable material has been received in the section then receiving such material. For such purpose, the shaft 20 has a resilient means or spring 30 (FIGS. 2 and 3) connected thereto through a crank arm 31 which is adjustably secured to the outer right hand end of the shaft 20 as viewed in FIG. 2. The lower end of the spring 30 is connected to a fixed pin 32 which is disposed vertically below the rotatable shaft 20. Thus, when the measuring pan M is in the position shown in FIGS. 2 and 5, the spring 30 is off-center with respect to the shaft 20 and is therefore exerting a force tending to hold the measuring pan M in such inclined position of FIGS. 2 and 5. However, when a sufficient amount of water W or other flowable material has been received in the measuring section M′, the measuring device M will pivot in a counterclockwise direction causing the spring 30 to shift to the right (FIG. 3) until the crank arm 31 is in the dotted line position (FIG. 3) and the measuring pan M is in the dotted line position of FIG. 5. The measuring device M is then inclined so as to receive the water W or other flowable material in the other measuring section M″. When a sufficient amount of such material W has been received by the section M″, the measuring device M will shift clockwise to the solid line position of FIG. 5. Such action will be repeated so that alternately each section M′ and M″ is filled and discharged with the water W or other flowable material so long as the water W or other flowable material is being introduced into the measuring pan M, and regardless of the extent of the volume and pressure of such water W.

The flow of the water or other flowable material W to the measuring pan M is controlled by an inlet pipe 35 which has an outlet 35a at a mid-point in the housing 10 approximately over the shaft 20. The pipe or tube 35 is normally connected with a float valve 37 which automatically controls the inlet of the fresh water W in response to the level of the water or liquid in the tank T (FIG. 1). The float valve 37 is a standard type of float valve which is positioned at a suitable elevation in the tank T so as to permit the introduction of fresh water through an inlet line 38 from any suitable source when the upper level of the fluid F in the tank T falls below a predetermined height. When the float 37a floats up to the liquid height or level at which the valve 37 is set to cut off the inlet of water or other liquid through the line 38, the valve 37 is closed, thereby stopping the flow of water through the line 35 to the measuring pan M. When the level of the fluid F drops, the float 37a also lowers to open the valve 37 and resumes the inlet of water or other material through the lines 38 and 35 to the apparatus A.

For the purpose of introducing the livestock supplement L or other flowable material from the drum D into the container 10, a metering pump P (FIGS. 2 and 4) is provided which may be of any suitable form. As illustrated, pump P includes a piston 40 which is adapted to reciprocate within a cylinder 41. A suitable O ring 40a formed of rubber or other resilient material is preferably provided on the piston 40 for assuring effective piston action. The cylinder 41 is attached to a base 42 by suitable bolts 43 or any other suitable attaching means. The base 42 has a bore or chamber 42a formed therein which is in communication with the bore 41a of the cylinder 41 and actually forms a continuation thereof. A counterbore 42b is provided below the bore 42a and it establishes communication between the bore 42a and a suitable outlet opening 42c. A nipple 44 is threaded in the opening 42c and has a hose 45 of rubber, plastic, or other suitable flexible material connected therewith. The hose 45 extends downwardly (FIGS. 1 and 2) through an opening 46 in the drum or tank D so as to have its lower end positioned at or near the bottom of the drum or tank D. A foot valve 47 of conventional construction is preferably provided at the lower end of the hose 45 to prevent backflow of the liquid L after it has been pumped into the hose 45 with the pump P, as will be more evident hereinafter. The foot valve 47 is basically a one-way check valve which permits the liquid L to flow upwardly through the hose 45 without permitting it to return downwardly therethrough.

A check valve is also provided within the counterbore 42b by means of a disc 50 which is formed of rubber or other suitable sealing material and which has a metal disc or weight 50 therewith. As the piston 40 moves upwardly, the check valve members 50 and 51 are adapted to rise sufficiently to allow the inlet of the liquid L through the hose 45 into the counterbore 42b, bore 42a and cylinder bore 41a. When the upward movement of the piston 40 is stopped, the weight of the disc 51 which is formed of aluminum, steel or other material is sufficient to reseat the rubber wafer or disc 50 to close the opening 42c and prevent the liquid which is above the wafer or disc 50 from returning downwardly through the opening 42c. The disc 51 is maintained in the bore 42b during its various movements by a keeper arm 55 which is attached to the base 42 by a suitable means such as a machine screw 55a.

The bore 42a is in communication with discharge passages 42d and 42e which are adapted to discharge liquid from the bore 42a upon a downward stroke of the piston 40. The passage 42e is in communication with an outlet bore 42f which has a hose connector 56 extending therefrom with a hose 57. The hose 57 is formed of rubber, plastic or other suitable resilient material which serves to discharge liquid into the interior of the housing 10 through a suitable opening 10a (FIG. 2) in the housing 10. A one-way check valve including a disc or wafer 58 formed of rubber, plastic or other similar material and a disc 59 formed of metal or other material is provided for controlling the flow of the discharge liquid as the piston 40 moves downwardly. Such one-way check valve which includes the wafer 58 and the disc 59 corresponds to the parts of the check valve indicated at 50 and 51 at the inlet end of the pump P. Thus, the check valve 58, 59 permits a discharge of the liquid from the pump P and prevents a return of any liquid which has passed such valve and is in the hose 57.

The base 42 may be mounted on any suitable support, but as shown in the drawings (FIGS. 2 and 4), the base 42 is mounted on an angle bracket 60 which is attached to the housing 10 with bolts or screws 60a and to the base 42 with screws or bolts 60b or any other suitable securing means.

The piston 40 is reciprocated in response to the pivotal movement of the measuring device M. For such purpose, the piston 40 has a connecting link 61 pivotally connected to the upper end of the piston 40 at a pivot pin 62. The upper end of the link 61 is secured to an adjustable connecting arm 63 having a plurality of openings 63a therein. A suitable connecting member such as the bolt 61a is provided for positioning the arm 61 with respect to any one of the selected holes 63a, thereby determining the stroke of the piston 40, as will be more evident.

The connecting arm 63 is attached to the rotatable shaft 20 so as to pivot or move arcuately back and forth as the shaft 20 moves back and forth with the measuring pan M. The connection of the connector arm 63 to the shaft 20 may be made by any suitable means such as a set screw 64 which is threaded into the connector arm 63 and frictionally engages the external surface of the shaft 20 as best seen in FIG. 4. Thus, as the shaft 20 turns back and forth through an arc as determined by the extent of travel of the measuring pan M, the arcuate motion is transmitted to the connector arm 63 which in turn causes a vertical reciprocatory motion of the link 61 and the piston 40. Thus, by way of example, as the measuring pan M moves from the solid line position of FIG. 5, it moves in a counterclockwise direction which causes a counterclockwise movement of the connector arm 63 and a lifting of the piston 40. Such lifting of the piston 40 creates a reduced pressure or a suction within the chamber below the piston 40 to cause the liquid L within the drum D to flow or be drawn into the chamber of the pump P. When the measuring device M moves from the dotted line position to the solid line position (FIG. 5) the connector arm 63 is moved downwardly in a clockwise direction, causing a downward movement of the piston 40 which results in a discharge of some of the fluid within the chamber of the pump P through the passages 42d, 42e, the bore 42f and ultimately through the hose 57 into the interior of the housing 10.

The apparatus A may be mounted in numerous ways, but for convenience, it is preferably mounted on a supporting framework which includes a horizontal base frame 70 and inclined braces 71, all of which are welded or bolted or otherwise secured to the drum D. Also, for convenience of use, the drum D preferably has a removable lid or cover 72 which is hinged as indicated at 72a (FIG. 2). In some instances, it may be preferable to use an ordinary liquid drum and position the apparatus A directly on top of the drum, but it has been found that the preferred construction as illustrated in the drawings is more desirable.

Considering now the operation of the apparatus of this invention when used for dispensing proportioned amounts of a livestock supplement into drinking water, it should first be noted that the drinking tank T is any galvanized metal tank, concrete tank or other tank customarily used on ranches and farms for the drinking water provided for the cattle or other livestock. In order to put the present invention into use, therefore, it is only necessary to position the apparatus A with the drum D and the float valve 37 as illustrated in FIG. 1. A source of controlled water such as pumped through a windmill, motor actuated pump or other pressure system is also needed to supply the fresh water through the inlet line 38 to the apparatus A. However, the apparatus A operates even though the pressure and volume of the water supplied from such water source varies in use. The apparatus A properly proportions the amount of the liquid livestock supplement L with respect to the fresh water introduced even though the volume and pressure of the water changes. Thus, with the apparatus positioned as illustrated in FIG. 1, connected to a controlled water system, and with an adequate amount of the livestock supplement L in the drum D, the apparatus then functions automatically to proportionately dispense the supplement L with the water from the line 38 into the tank T. When the level of the fluid F in the tank T is low enough so that the valve 37 is open and water 38 is flowing into the apparatus A, such water will be introduced into either the section M' or the section M" of the measuring device M. Assuming the measuring device M is in the solid line position of FIG. 5 at the start of the operation, the water or other flowable material W will be received in the measuring section M' until the weight of the water W within such section M' is sufficient to overcome the weight of the measuring pan M which is to the right of the shaft 20 and is tending to hold it in the inclined position. Also, any tendency of the spring 30 to hold the measuring pan M in the inclined position must be overcome by the weight of the water W.

When the predetermined quantity of the water or other material W has been received in the measuring section M' so as to cause it to pivot to the dotted line position of FIG. 5, the water or other material W is discharged from the open outer end of the section M' and the section M" is moved into position for then receiving a predetermined quantity of the water or other flowable material W. The flow of the fresh water through the inlet opening or nozzle 35a is of course continuous so that there is no interruption in the operation of the measuring device M, unless the level of the fluid F rises so high that it closes the float valve 37.

The shifting or pivoting of the measuring device M from the solid line position of FIG. 5 to the dotted line position causes a movement of the piston 40 upwardly to draw in some of the livestock supplement L or other material within the tank D. The amount of the liquid L which is drawn into the pump P depends upon the stroke of the piston 40 which may be adjusted as previously explained. Also, the size of the piston and cylinder may be varied or changed to change the quantity of the livestock supplement L that is drawn in with each stroke. The measuring device M remains in the dotted line position until the amount of the water or other material W is again sufficient to counteract the weight of the measuring device M which is disposed to the left of the shaft 20 and is tending to keep the measuring device M in the inclined position. Also, when the spring 30 is utilized, the weight of the water W must be sufficient to overcome any tendency of the spring 30 to hold the measuring device M in the inclined dotted position of FIG. 5. When the quantity of water or material W has been received by the section M' the measuring device M shifts from the dotted line position to the solid line position in FIG. 5, causing a downward stroke of the piston 40 and a discharge of the liquid L through the pump and the discharge tube 57 into the interior of the housing 10. The quantity of the liquid L is thus metered or proportionately fed in response to the amount of the fresh water W which is introduced into the housing 10 and they are mixed together by the splashing which occurs within the housing 10 due to the water W being dropped by gravity from the measuring device M. The admixed liquids are discharged through the tube 12 into the tank T and provide the drinking water or fluid F for consumption by the cattle or the livestock.

It is to be noted the the spring 30 prevents a bouncing or an accidental positioning of the measuring device M so that the water might inadvertently be split between the two sections M' and M" and therefore it improves the operation of the measuring device M, even though it is not essential to its operation. It should also be noted that even though the mixing of the water W and the liquid L together in the housing 10 is desirable prior to distribution or discharge through the tubing 12 to the tank 10, in some cases, it may be preferable to discharge the liquid L from the pump P directly into the tank T since the end of the discharge tube 57 may be directed to any location or in any position desired. Since the apparatus of this invention is particularly suitable for metering a livestock supplement such as a phosphoric acid, the various parts of the apparatus are preferably made of materials which will not corrode or be affected by the acidic condition of the liquids being handled. Thus, stainless steel is generally employed where metals are needed and synthetic resins or plastics are generally employed where flexible parts are indicated. The housing 10 may be made of a transparent material in some instances in order to permit a viewing of the operation of the apparatus A without opening the lid or cover 11. However, even if the housing 10 is not transparent, the operation of the apparatus A may be readily checked in the field by merely lifting the cover 11.

An alternative form of the invention is illustrated in FIG. 6 which is identical to the construction shown in FIGS. 1–5, except that an additional pump P–1 is employed together with the pump P. The shaft 20 is replaced with a longer shaft 120, or a suitable extension of the shaft 20 may be provided to form the longer shaft 120 as shown in FIG. 6. Thus, for each movement of the measuring pan M both the pump P and the pump P–1 are actuated, each of which is connected to a different drum or tank of chemical so that the two different chemicals are automatically fed into the housing 10 at the same time by the single action of the measuring device M. Thus, the pump P–1 has a suction hose 145 which corresponds with the hose 45 on the pump P and such hose 145 would extend into a drum similar to the drum D of FIG. 1. The pump P–1 has an outlet or discharge tube 157 which corresponds with the discharge tube 57 of the pump P, and both of which may be connected together as shown in FIG. 6 for discharging into the interior of the housing 10, or for discharge to any other point desied.

Thus, with the two metering units P and P–1 shown in FIG. 6, the apparatus of this invention is adapted to dispense two chemicals such as a mineral supplement and vitamins into the drinking water of the livestock. The supplements may be the phosphorus previously mentioned, calcium, vitamins, antibiotics or any other chemical which is desirable. it will be understood of course that even more metering units may be attached in tandem as shown in FIG. 6 so that as many supplements can be introduced with the fresh water as desired.

Although this invention has been particularly described for use in the dispensing of livestock supplements into fresh water, it will be understood that the invention has a much wider application and is suitable for proportionately dispensing various types of liquids or flowable materials. For example, agricultural substances such as liquid fertilizers may be mixed with a water system for distributing the liquid fertilizer during the watering or irrigation of the crops. Any desired concentration of the final admixed liquid discharged from the tube 12 may be obtained by controlling the variables provided with the apparatus. For example, the concentration of the initial liquid L may be varied itself, which is particularly desirable in the case of antibiotics. Also, the adjustability of the metering pump P through the adjusting holes 63a, and other mechanical variations of the pump make it possible to adjust the amount of the chemical L which is injected with each up and down stroke of the piston 40. The amount of the water or other material W which is introduced may also be changed by adjusting the positions of the stops 25, and by varying the size and characteristics of the measuring device M.

The foregoing disclosure and description of the invention is illustrative and explanatory thereof and various changes in the size, shape and materials, as well as in the details of the illustrated construction, may be made within the scope of the appended claims without departing from the spirit of the invention.

I claim:
1. A dispensing apparatus, comprising:
(a) pump means for pumping a first material in predetermined quantities, said pump including a cylinder and a piston reciprocable therein,
(b) said pump having an inlet for receiving said first material and a discharge for discharging said first material,
(c) conduit means connecting said inlet with a source of said first material,
(d) conduit means including a discharge outlet connecting said pump discharge for discharging said first material,
(e) said inlet conduit means terminating at a point below said discharge outlet of said conduit communicating with said pump discharge to inhibit flow through said pump except when said pump is actuated,
(f) actuating means for alternatively receiving a quantity of a second flowable material and discharging same therefrom,
(g) a measuring pan having at least two sections,
(h) pivot means for mounting said measuring pan for pivotal movement alternately to and from a first position and a second position,
(i) said measuring pan being adapted to receive a second flowable material in one of said sections and discharge from another of said sections in each of said first and second positions,
(j) means for alternately introducing a second material into each of said sections for alternately pivoting said measuring pan,
(k) means for maintaining said measuring pan in either the first position or the second position until the section being filled has received a predetermined quantity of said second material, and
(l) means connecting said measuring pan to said pump piston for actuating said pump piston in response to the pivotal movement of said measuring pan.

2. A dispensing apparatus comprising,
(a) pump means for pumping a first material in predetermined quantities, said pump including a cylinder and a piston reciprocable therein,
(b) said pump having an inlet for receiving said first material and a discharge for discharging said first material,
(c) conduit means connecting said inlet with a source of said first material,
(d) conduit means including a discharge outlet connecting said pump discharge for discharging said first material,
(e) said inlet conduit means terminating at a point below said discharge outlet of said conduit communicating with said pump discharge to inhibit flow through said pump except when said pump is actuated,
(f) actuating means for alternately receiving a quantity of a second flowable material and discharging same therefrom,
(g) a measuring pan having at least two sections,
(h) pivot means for mounting said measuring pan for pivotal movement alternately to and from a first position and a second position,
(i) said measuring pan being adapted to receive a second flowable material in one of said sections and discharge from another of said sections in each of said first and second positions,
(j) means for alternately introducing a second material into each of said sections for alternately pivoting said measuring pan,
(k) means for maintaining said measuring pain in either the first position or the second position until the section being filled has received a predetermined quantity of said second material, (l) means connecting said measuring pan to said pump piston for activating said pump piston in response to the pivotal movement of said measuring pan,
(m) shaft means connected with said measuring pan and rotatable when said measuring pan pivots,
(n) a link connected to said pump piston,
(o) an arm connected to said shaft, said arm having a plurality of openings therein, and
(p) means for connecting said link to a selected opening in said arm whereby the stroke of said piston may be adjusted to determine the volume of said first material pumped.

References Cited by the Examiner

UNITED STATES PATENTS

| | | | |
|---|---|---|---|
| 1,575,433 | 3/26 | Lichtenthaler | 222—57 |
| 1,906,911 | 5/33 | Lippert | 222—498 X |

FOREIGN PATENTS 220,587   12/57   Australia.

RAPHAEL M. LUPO, *Primary Examiner.*